INVENTOR.
JOHN P. HYNES
HAROLD C. LOFGREN

BY

ATTORNEY.

United States Patent Office 3,574,078
Patented Apr. 6, 1971

3,574,078
COMPOSITE ELECTRODE-DIFFUSION MEDIUM
FOR ELECTROCHEMICAL SENSORS
John P. Hynes and Harold C. Lofgren, Minneapolis,
Minn., assignors to Honeywell Inc., Minneapolis, Minn.
Filed Nov. 18, 1968, Ser. No. 776,360
Int. Cl. G01n 27/46
U.S. Cl. 204—195                                    5 Claims

ABSTRACT OF THE DISCLOSURE

A composite electrode-diffusion medium, for use with electrochemical cells particularly of the polarographic type such as those used for oxygen sensing, consisting of a laminated permeable diffusion medium having an electrode body carried by one of the laminations.

BACKGROUND OF THE INVENTION

This invention is concerned with the improvement of electrochemical cells, particularly those of the type used to determine the proportionate amounts of a gas or gases dissolved in a liquid or carried by another gas or vapor. More specifically, this invention is concerned with an improved electrode-diffusion medium composite for such cells whereby the operation of the cells is improved. Diffusion media are typically used with polarographic cells of the type disclosed in U.S. Pats. 2,913,386; 3,000,805 and 3,239,444. Polarographic cells generally, and the cells of the aforementioned patent specifically, include an electrolyte, a polarizing electrode and reference electrodes. Typically a reference electrode is silver-silver chloride, the polarizing electrode is gold or platinum and the electrolyte is an aqueous solution of potassium chloride. As can be seen from these patents, polarographic cells of this type have found wide use in oxygen determinations, such as sensing, measuring and analyzing. While the present invention is considered to be applicable to a wide variety of electrochemical cells and particularly to the determination of the concentration of proportional amounts of a number of reactive gases in a variety of liquids and other gas mixtures, the discussion which follows is limited to a description of this invention in connection with the determination of oxygen in a liquid or a gas by means of the aforementioned polarographic type cells. It should be understood that other types of electrochemical cells and other reactive gases or species, such as chlorine, bromine, sulfur dioxide, etc. can be determined using the present invention in a cell of the proper type and that other liquids and gases containing the specie or species to be determined may be similarly used.

The diffusion media utilized in the prior art polarographic oxygen sensors have been for the most part thin membranes or permeable material such as polyethylene, polytetrafluoroethylene or rubber. These prior art diffusion media (typically disclosed in the aforementioned U.S. Pats. 2,913,386 and 3,000,805) have been satisfactory to a degree. However, the use of a separate membrane and electrode has necessitated close spacing tolerances in the relative positioning between the membrane and cell electrode with a reaction site, gap or spacing therebetween filled with an appropriate electrolyte. In consequence, changes in the membrane, such as movement or changes in its tension, have been found to occur. These changes affect the relationship between the membrane and cell electrode and affect the stability of cell response, giving rise to undesirable background noises.

One prior art approach at solving some of these problems has been the vacuum deposition of the cathode electrode onto a surface of the membrane in the form of a thin metallic layer as shown in the aforementioned U.S. Pat. 3,239,444 which is assigned to the same assignee as the present invention. This approach avoids the variable spacing problem existing between the diffusion media and the electrode. By using a very thin layer of electrode material on the interiorly exposed surface of the membrane, the electrode inescapably moves with the membrane and the problem of spacing variations therebetween is obviated. However, the resulting structure is extremely delicate and the electrode has been found to lack adherence to the membrane. Such composite electrode-membrane structures have therefore been found to have short life times, in the order of a few months in some instances.

In some cases, adhesives have been used to fasten the electrode material to the membrane. However, adhesives have been found to impede oxygen diffusion through the membrane and otherwise interfere with the electrode reaction which takes place in the cell at the face of the electrode-membrane composite.

Another approach to the problem is disclosed in copending application Ser. No. 633,056, now U.S. Pat. 3,510,420 which is assigned to the same assignee as the present invention. The solution offered by this copending application consists in the provision of a permeable polytetrafluoroethylene body containing a layer of discrete gold particles which are pressed into the membrane film. This approach also suffers certain drawbacks. For example, since discrete particles are used and the plastic film must be filled with them, uniform electrical contact therebetween becomes a problem necessitating very careful preparation techniques.

SUMMARY OF THE INVENTION

This invention provides a novel and improved composite electrode-diffusion medium. The improved composite comprises a laminated structure including two layers of chemically inert, permeable material which are bonded together. An electrode body, to which electrical contact may be made, is carried by one of the layers. In the laminated structure thus provided, the layer containing the electrode serves primarily as a carrier layer and positioning means for the electrode body whereas the other layer serves as a barrier layer which provides control over the diffusion of the specie or species of interest into the cell.

BRIEF DESCRIPTION OF THE DRAWING

FIG. 2b is a top detailed view of the composite structure of FIG. 2a.

DESCRIPTION OF THE PREFERRED EMBODIMENTS

Figure 1:
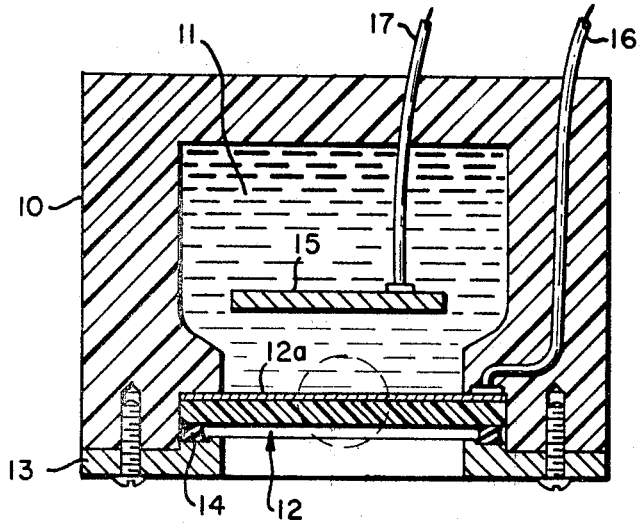
FIG. 1 is a schematic representation illustrating an oxygen sensor utilizing the improved laminated composite electrode-diffusion medium provided by this invention.

In FIG. 1 there is illustrated an electrochemical cell for determining the concentration of oxygen in a liquid or gas. The cell comprises a generally cylindrical body 10 which provides a chamber 11 containing an electrolyte such as 0.1 N KCl in water, an aqueous solution of sodium sulphide and glycerine or other suitable electrolyte. An opening is provided at the lower end of body 10 which communicates with the interior of chamber 11 and the electrolyte contained therein. Across the opening is a laminated composite electrode-diffusion medium 12 according to this invention, which is oxygen permeable thereby allowing the diffusion of oxygen therethrough and into electrolyte 11. Retaining means 13 and sealing means 14, such as an O-ring or Quad ring are provided to maintain diffusion medium 12 in a sealing position across the opening in body 10. The electrode portion 12a of diffusion medium 12 is exposed to electrolyte 11 as shown. Another electrode 15 (typically a silver metal with a silver chloride film anode) is located in chamber 11 and spaced a small distance from electrode portion 12a. The electrodes are electrically contacted by electrical leads 16 and 17 respectively.

Figure 2B:
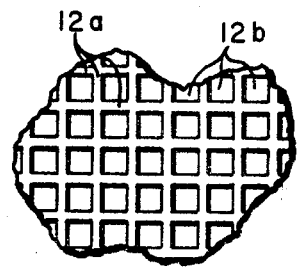
Figure 2A:
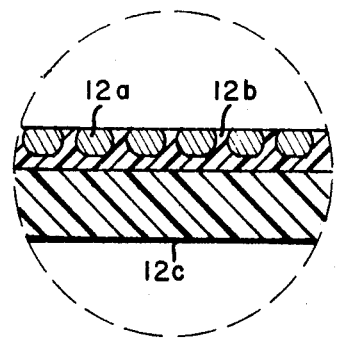
FIG. 2a is an enlarged fragmentary view of the composite structure taken as indicated from FIG. 1.

As shown in FIG. 1 and more particularly in FIGS. 2a and 2b, diffusion medium 12 in accordance with a preferred embodiment of the invention comprises an oxygen permeable carrier layer 12b and an oxygen permeable barrier layer 12c intimately bonded to each other at their interface. Carried by carrier layer 12b is an electrode body 12a which in its preferred form is an apertured mesh or screen which has been pressed into the carrier layer as will be described in more detail hereinbelow.

The laminated composite of the foregoing structure provides a carrier layer which supports and positions or carries the electrode body in a fixed permanent relationship with respect to the barrier layer. The barrier layer provides a uniform diffusional resistance path which is reproducible from composite to composite, thus making possible a high degree of electrical reproducibility in cells from a manufacturing standpoint.

Figure 3:
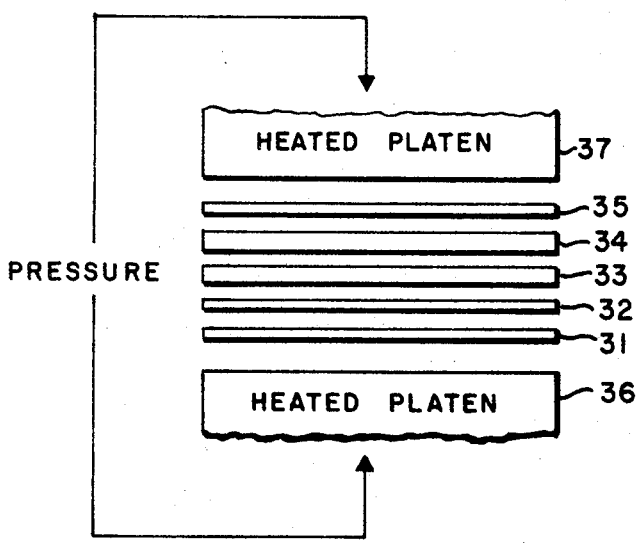
FIG. 3 is a schematic illustration of a method for preparing the laminated composite of this invention.

Referring now to FIG. 3, a particularly preferred embodiment of the composite electrode-diffusion medium according to this invention and a method of making it is described. This embodiment is prepared by pressing an apertured gold body cut to a desired form from a piece of 333 lines per inch mesh screen, having a thickness of between about 0.2 to about 0.3 mils thick, into a film of fluorinated ethylene-propylene copolymer (such as 0.5 mil FEP type A, manufactured by Du Pont) while simultaneously bonding the carrier layer to a barrier layer which consists of a film of tetrafluoroethylene (such as 1 mil Emflon UTF–100, manufactured by Pallflex Products Corporation).

As shown in the figure, the laminated composite may be prepared by placing an aluminum foil slip sheet 31, the electrode body, such as the mesh or screen, 32, the carrier film 33, the barrier film 34, and a second aluminum foil slip sheet 35 in a die (not shown) between the heated platens 36 and 37 of a press. With the application of suitable pressure and heat, the electrode body 32 is pressed into the carrier layer 33 simultaneously with the bonding of the carrier layer 33 to the barrier layer 34. The heated platens are schematically illustrated here for simplicity but it should be understood that they form parts of a die set, press or the like which is adapted to apply pressure and heat to elements 31 through 35 as shown in the figure.

For the preferred embodiment described hereinabove consisting of an apertured gold screen of about 0.2 to 0.3 mil thick pressed into 0.5 mil thick fluorinated ethylene propylene which is in turn bonded to 1 mil thick tetrafluoroethylene, a pressure of 380 p.s.i. and a temperature of about 520° F. maintained for about 1 minute has been found satisfactory in preparing the laminated composite. After pressing, the composite is allowed to cool below about 400° F. under pressure before removing it from the press. The compressed laminated structure may then be removed from between the platens, the aluminum separators etched away with a sodium hydroxide solution and the membrane may be cleaned with nitric acid. When washed and dried, the membrane is ready for use in a cell of the type shown in FIG. 1.

The diffusion media prepared in this fashion has the electrode body confined to and carried by the carrier layer 33. To achieve this by the method described above, the materials selected for the carrier layer and the barrier layer should be of relatively low and high softening points respectively and the temperature applied during bonding should be lower than the softening point of the barrier layer. The temperature of pressing is not critical otherwise and can be accomplished at any temperature wherein the carrier layer is intimately bonded to the barrier layer without softening the barrier layer to the extent that it allows the entrance of the electrode body therein. Of course, the temperatures, pressures, and times mentioned hereinabove are merely preferred for the particular materials described and are not deemed critical in any respect. Furthermore, these parameters will vary depending on the particular materials used for the carrier layer, the barrier layer and the electrode body.

With respect to the particularly preferred screen-like or mesh electrode body, it is preferred that a fine mesh or screen of suitable metal be used; the finer the mesh the more desirable it is from an operational standpoint. Gold is preferred for the metal, however, any suitable metal that is commonly known in the art may be used, such as platinum and the other noble metals. The noble metals are preferred since they do not tend to corrode. Insofar as the electrode body is concerned generally, it is not necessary that it be a mesh or screen since it can be any type of electrically conductive body capable of allowing diffusion or permeation of the particular species of interest, such as oxygen in the case described herein, through the diffusion medium and of providing contact sites between the electrode body and the electrolyte of the cell to allow the chemical reactions necessary for operation of the cell.

The overall dimension of the laminated composite is preferred at between about 1 to 10 mils. Within any particular overall dimension, it is preferred that the barrier layer be the thicker layer so as to be controlling with regard to gaseous diffusion and that the carrier layer therefore be the thinner layer. It is also preferred that the electrode body be about as thick as the carrier layer and that it be supported therein without contacting or just contacting the carrier-barrier interface.

Insofar as the nature of the preferred barrier and carrier layer materials are concerned, they may be generally characterized as follows: the carrier layer should be of a relatively low softening point, permeable, material capable of bonding to or fusing with the barrier layer material which should be a relatively high softening point, permeable, material.

The following additional specific examples of barrier-carrier layer combinations are offered for the purpose of explicitly teaching the nature of this invention.

| Barrier layer | Carrier layer |
| --- | --- |
| High melting point or relatively high density polyethylene, e.g., 260° F. type. | Low melting point or relatively low density polyethylene e.g., 230° F. type. |
| High melting point or relatively high density polypropylene, e.g. 260° F. type. | Low melting point or relatively low density polypropylene e.g., 200° F. type. |
| Fluorinated ethylene-propylene copolymer. | High melting point or high density polyethylene, e.g. 260° F. type. |
| Do | Low melting point or low density polyethylene, e.g. 230° F. type. |
| Tetrafluoroethylene polymer | High melting point or high density polyethylene, e.g. 260° type. |
| Do | Low melting point or low density polyethylene, e.g. 230° F. type. |
| Fluorinated ethylene-propylene copolymer. | High melting point or high density polypropylene, e.g. 260° F. type. |
| Do | Low melting point or low density polypropylene, e.g. 200° F. type. |
| Tetrafluoroethylene polymer | High melting point or high density polypropylene, e.g. 260° F. type. |
| Do | Low melting point or low density polypropylene, e.g. 200° F. type. |

Having described the invention it will be readily apparent to those familiar with this art that many modifications of it are possible. It should therefore be understood that the invention is not to be limited by the embodiments described but only by the scope of the following claims.

The embodiments of the invention in which an exclusive property or right is claimed are defined as follows:

1. A polarographic cell adapted to be used in the determination of the concentration of an oxidizing gas dispersed in a fluid comprising:
  (a) a first body defining a chamber with an opening across at least a portion of one surface of the chamber,
  (b) a reference electrode contained within said chamber in gas-tight isolation, other than by said opening, from the environment external to said chamber,
  (c) a gas permeable composite electrode-membrane member in generally sheet form in liquid tight engagement with said opening in said chamber, said composite membrane member comprising two zones, the first zone including one face region of said composite membrane member and comprising a first gas permeable non-conductive material facing exteriorly to said chamber, the second zone including the opposite face region of said member and comprising a second gas permeable non-conductive material having a metallic electrode member embedded therein so as to leave a surface exposed to permit an electrotype solution to contact said metal, said second material having a lower melting point than said first material, and
  (d) an electrolyte solution in said cell in electrical contact with said reference electrode and with said composite electrode-membrane member.

2. A cell in accordance with claim 1 wherein the electrode member embedded in said membrane is in the form of a mesh.

3. The cell in accordance with claim 2 wherein the electrode member is gold.

4. The cell in accordance with claim 1 wherein the second material is a fluorinated ethylene-propylene and the first material is tetrafluoro ethylene.

5. A cell in accordance with claim 4 wherein the electrode member is a gold metal.

References Cited

UNITED STATES PATENTS

| | | | |
|---|---|---|---|
| 3,134,697 | 5/1964 | Niedrach | 136—86 |
| 3,239,444 | 3/1966 | Heldenbrand | 204—195 |
| 3,328,204 | 6/1967 | Grubb | 136—86 |
| 3,429,796 | 2/1969 | Lauer | 204—195 |
| 3,481,737 | 12/1969 | Siebenberg et al. | 136—86 |

TA-HSUNG TUNG, Primary Examiner

U.S. Cl. X.R.

204—279